United States Patent [19]
Kuroda et al.

[11] Patent Number: 5,978,327
[45] Date of Patent: Nov. 2, 1999

[54] OPTICAL RECORDING MEDIUM FOR LAND-AND-GROOVE RECORDING SYSTEM

[75] Inventors: Sumio Kuroda; Mineo Moribe; Koichi Iida, all of Kanagawa, Japan

[73] Assignee: Fujitsu Limited, Kawasaki, Japan

[21] Appl. No.: 08/804,897

[22] Filed: Feb. 24, 1997

[30] Foreign Application Priority Data

Aug. 30, 1996 [JP] Japan .................................. 8-231139

[51] Int. Cl.⁶ .................................................. G11B 7/095
[52] U.S. Cl. .................................... 369/44.26; 369/44.34; 369/275.3; 369/275.4
[58] Field of Search .............................. 369/44.26, 44.34, 369/275.3–275.4

[56] References Cited

U.S. PATENT DOCUMENTS

| | | | |
|---|---|---|---|
| 4,707,816 | 11/1987 | Yonezawa et al. | 369/44.34 X |
| 5,383,176 | 1/1995 | Inui et al. | 369/275.4 |
| 5,493,552 | 2/1996 | Kobori | 369/275.4 X |
| 5,774,439 | 6/1998 | Aoki et al. | 369/275.3 X |

FOREIGN PATENT DOCUMENTS

| | | |
|---|---|---|
| 6-28729 | 2/1994 | Japan . |
| 6-131701 | 5/1994 | Japan . |
| 7-29186 | 1/1995 | Japan . |
| 7-161077 | 6/1995 | Japan . |

*Primary Examiner*—W. R. Young
*Attorney, Agent, or Firm*—Greer, Burns, & Crain Ltd.

[57] ABSTRACT

An optical recording medium in which information can be recorded in tracks formed by both lands and grooves provided between lands, and rows of prepits corresponding to preformat information in both adjacent lands and grooves are formed by deviating in the circumferential direction. Counting grooves for counting tracks are formed at both sides of the row of prepits for the land, the prepit for the groove has a depth or width different from that of the groove, the counting groove has a depth or width different from that of the groove, and the prepit for the land is formed narrower and/or shallower than the counting groove.

6 Claims, 14 Drawing Sheets

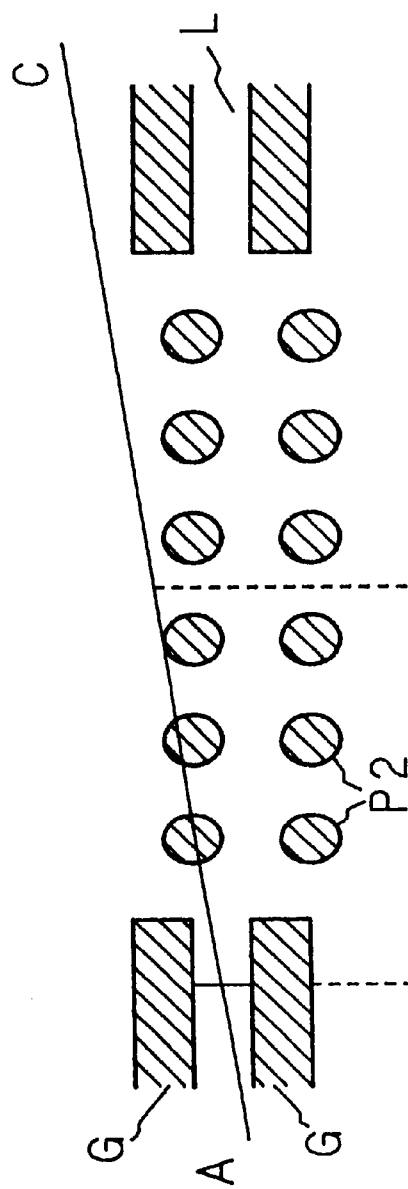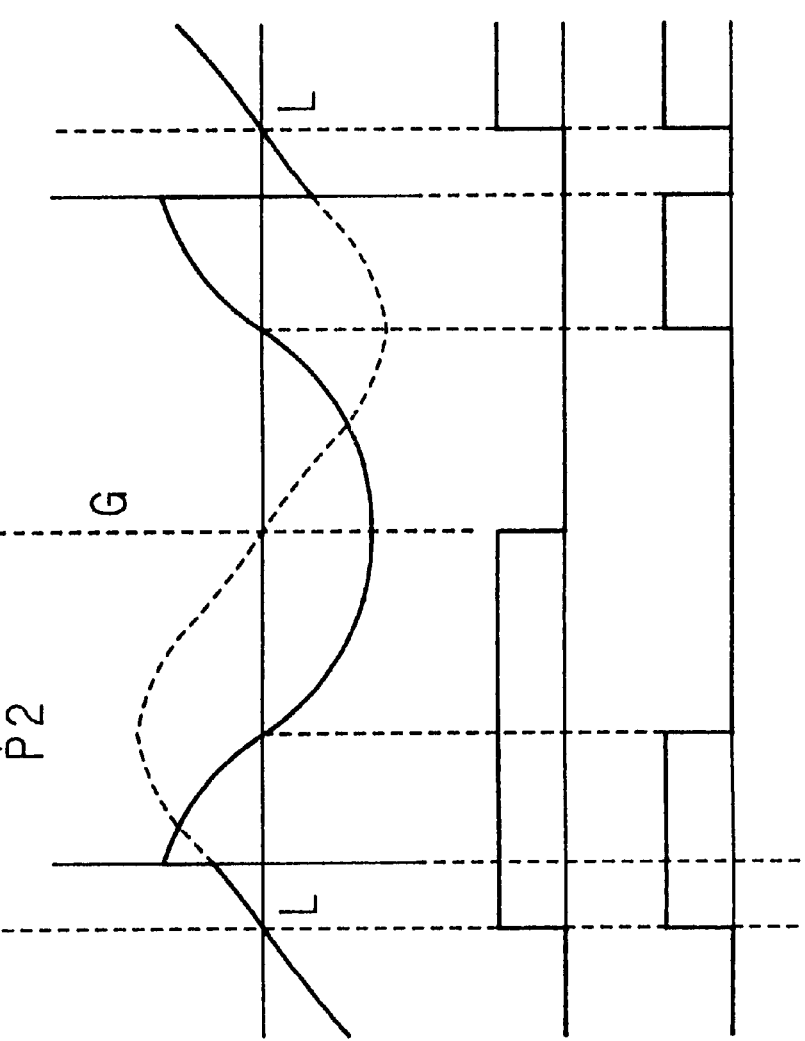
FIG. 2a PRIOR ART
FIG. 2b PRIOR ART
FIG. 2c PRIOR ART
FIG. 2d PRIOR ART

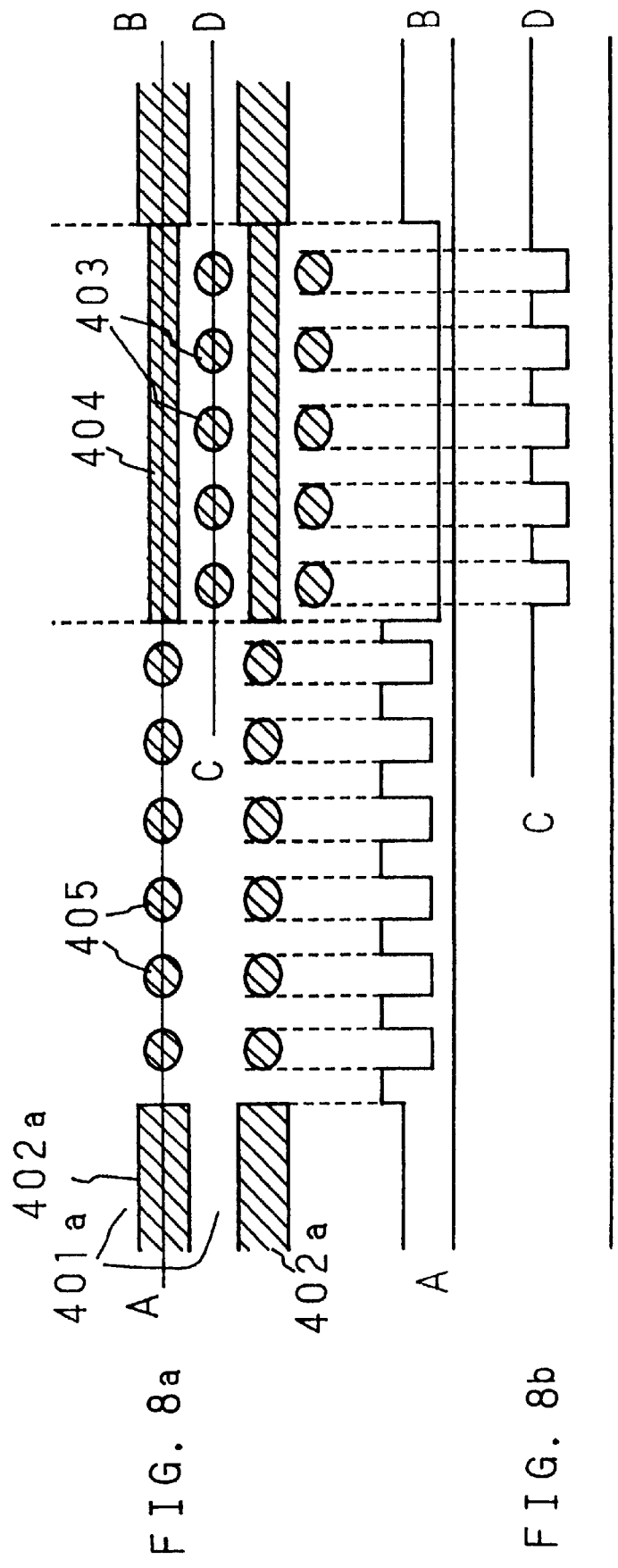

OPTICAL RECORDING MEDIUM FOR LAND-AND-GROOVE RECORDING SYSTEM

BACKGROUND OF THE INVENTION

1. Field of the Invention

The present invention relates to an optical recording medium and a drive of such optical recording medium, and more particularly to a preformatted portion, in which preformat information such as ID information is recorded, of an optical recording medium employing a land/groove recording system enabling recording at high density by varying the height of adjacent tracks.

2. Description of the Prior Art

Recently, as the computer becomes higher in performance, there is an increasing demand for memories of larger capacity, and optical disks and magneto-optical disks are developed. Toward the forthcoming age of multimedia, a further larger capacity is required. Optical disks include the read-only type, write-once type, and multiple recordable type such as magneto-optical disk.

Recordable optical disks are classified into a type of using a phase changing material in the recording film, and a type of using magneto-optical material. The phase changing material induces phase shift between, for example, crystal and amorphous, becoming crystal and raised in light reflectivity when exceeding a certain temperature T1, and becoming amorphous and lowered in light reflectivity when exceeding a certain temperature T2. Such reflectivity changes are made to correspond to "0" and "1", and recording and reproduction are executed. When recording in such optical disk, using a beam focused to about 1 μm, the temperature of the optical disk surface is raised until phase change takes place. When erasing, by lowering to a temperature below the recording point, it is returned to the state before recording. When reproducing this optical disk, by illuminating with light sufficiently weaker than in recording and erasing, "0" and "1" can be read out from the difference in light reflectivity between recorded portion and erased portion.

The magneto-optical material forms a vertical magnetized film on a substrate, and is initialized by first applying an external magnetic field in one direction. When recording, on its surface, an external magnetic field is applied in the opposite direction of initialization, and the surface is heated by a beam focused to about 1 μm nearly to the Curie temperature to decrease the coercive force of the surface portion, and the magnetization is inverted to a direction of the external magnetic field. When erasing, the external magnetic field is set in a same direction as in initializing. When reproducing, a polarized beam is emitted to the disk, and the direction of Kerr rotation by the magnetization direction of magnetic film is read out by an optical system for detecting polarization such as an analyzer.

In a conventional optical recording medium, as shown in FIG. 1, a convex track (land) 3 divided by a V-section groove 1 is a record region of pits 4 for expressing record information, and this track is divided into sectors of predetermined length, and an ID signal expressing the position information is recorded at the beginning of each sector in an array of prepits 2.

To enhance density in such conventional optical recording medium, hitherto, a land/groove recording system has been proposed for widening the groove used in division of track and recording information also therein. When the ID signal is formed in prepits in this method as in the prior art, since the interval of adjacent tracks is narrow, an adjacent signal often mixes in to cause crosstalk, and the ID signal cannot be reproduced correctly.

Accordingly, various ID signal recording and reproducing methods have been proposed for the land/groove recording system, but when such recording and reproducing methods are realized, the speed detection of optical head often goes wrong.

FIG. 2 (a) is a top view of an example of an ID signal recording and reproducing system involving the possibility of error in speed detection. In this optical recording medium, a row of prepits P2 for ID signal is arranged at an intermediate position in the radial direction between the concave groove track G and convex land track L, and the row of prepits P2 for ID signal is shared between the land track L and groove track G on both sides. In this ID signal recording and reproducing system, a groove (not shown) penetrating through the row of prepits P2 is provided so that error may not be caused in track counting when the optical head moves between the tracks.

In this system, when the optical head moves from A to C between the tracks, as the optical head moves from the recording/reproducing region including the groove G to the ID information region including the row of prepits P2 or from the ID information region to the recording/reproducing region, as shown in FIG. 2 (b), the track error signal indicated by dotted line is deviated in phase by 90° as indicated by solid line, and the binary signal of the tracking error which is intended to be inverted at an intermediate position in the track direction of the ID information region as shown in FIG. 2 (c) is inverted at a different interval from the intended inverting time interval as shown in FIG. 2 (d), and an error is caused in track counting. Speed control of the optical head when tracking a specified track at the time of seeking is done during the time of crossing one track from inversion to next inversion of the binary signal of the tracking error signal, and the demerit is that the target track cannot be determined accurately.

FIG. 3 is a top view of another example of ID signal recording and reproducing system involving error in speed detection. In this optical recording medium, a concave groove track G and a convex land track L individually include a row of prepits P3 for ID signal. However, to prevent crosstalk between rows of prepits P3 as mentioned above, a row of prepits P3 of groove track G is arranged in the first half of the ID information region, and a row of prepits P3 of land track L in the latter half. In this ID signal recording and reproducing system, in order to prevent error in track count when the optical head moves between the tracks, a groove G1 penetrating through the row of prepits P3 is provided.

In this system, since the row of prepits P3 for land track L is positioned in the middle (180°) of the adjacent groove tracks G, the tracking error signal produced from the row of prepits P3 for land track L is deviated by 180° in phase from the tracking error occurring elsewhere, and an error is involved in the track counting.

BRIEF SUMMARY OF THE INVENTION

It is an object of the invention to present an optical recording medium capable of obtaining a tracking error signal necessary for accurate track counting, and an ID signal of a sufficient amplitude.

It is another object of the invention to present a drive capable of obtaining a tracking error signal necessary for accurate track counting.

In the conventional optical recording medium, it is a problem that the drive does not recognize the land track as a land track, and the groove track as a groove track. Therefore, without coupling the rows of prepits of land tracks by grooves, counting grooves are formed at both sides of the row of prepits, and a tracking error signal is obtained from the counting grooves. As the constitution of such optical recording medium, two types may be considered; one is the optical recording medium conforming to first to third aspects of the invention, and the other is the optical recording medium conforming to fourth to sixth aspects of the invention.

In the optical recording medium of the first aspect of the invention, information can be recorded in tracks formed by both lands and grooves provided between lands, and rows of prepits corresponding to preformat information in both adjacent lands and grooves are formed by deviating in the circumferential direction; counting grooves for counting tracks are formed at both sides of the row of prepits for the land; and the prepit for the groove has a depth or width different from that of the groove, the counting groove has a depth or width different from that of the groove, and the prepit for the land is formed narrower and/or shallower than the counting groove.

In the optical recording medium of the second aspect of the invention, relating to the first aspect, the prepit for the groove is formed narrower and/or shallower than the groove, and the counting groove is formed narrower and/or shallower than the groove.

In the optical recording medium of the third aspect of the invention, relating to the first aspect, the prepit for the groove is formed deeper and/or wider than the groove, and the prepit for the land is formed deeper than the groove.

In the optical recording medium of the first to third aspects of the invention, as shown in FIG. 4, as seen by light beam, the counting groove should be formed deeper than the prepit for the land track. In this case, it is not always necessary to couple the rows of prepits of the groove track by the groove. Herein, the drive may be a conventional one.

In the optical recording medium of the fourth aspect of the invention, information can be recorded in tracks formed by both lands and grooves provided between lands, and rows of prepits corresponding to preformat information in both adjacent lands and grooves are formed by deviating in the circumferential direction; counting grooves for counting tracks are formed at both sides of the row of prepits for the land, and penetration grooves are formed so as to penetrate through the rows of prepits for the groove; and the penetration groove has a depth or width different from that of the groove, the prepit for the groove is formed wider and/or deeper than the penetration groove, the counting groove has a depth or width different from that of the groove, and the prepit for the land is formed wider and/or deeper than the counting groove.

In the optical recording medium of the fifth aspect of the invention, relating to the fourth aspect, the prepit for the groove is formed narrower and/or shallower than the groove, and the counting groove is formed narrower and/or shallower than the groove.

In the optical recording medium of the sixth aspect of the invention, relating to the fourth aspect, the penetration groove and the counting groove are formed narrower and deeper than the groove.

In the optical recording medium of the fourth to sixth aspects of the invention, as shown in FIG. 9, as seen by light beam, the counting groove is formed shallower than the prepit of the land track, and by coupling the rows of prepits of the groove track by the groove, error in track counting can be prevented. In this case, two outputs of a two-division detector are converted from current into voltage, and amplified by an amplifier having a sufficiently high band so that the pit signal may be visible. The amplified signal is passed through a peak hold circuit, and a sum signal and a difference signal are produced, and the difference signal is divided by the sum signal to obtain a tracking error signal.

In the optical recording medium of the seventh aspect of the invention, information can be recorded in tracks formed by both lands and grooves provided between lands, and rows of prepits corresponding to preformat information in both adjacent lands and grooves are formed by deviating in the circumferential direction; and a signal region for recognizing the prepit is the prepit for the land is provided at both sides of the row of prepits for the land. In this optical recording medium, since the signal region for recognizing the prepit is the prepit for the land is provided at both sides of the row of prepits for the land, the preformat information such as ID signal can be recognized sufficiently.

In the optical recording medium of the eighth aspect of the invention, information can be recorded in tracks formed by both lands and grooves provided between lands, and rows of prepits corresponding to preformat information in both adjacent lands and grooves are formed by deviating in the circumferential direction; and counting grooves for counting tracks are provided at both sides of the row of prepits for the land. In this optical recording medium, since the counting grooves for counting tracks are provided at both sides of the row of prepits for the land, a tracking error signal necessary for accurate track counting can be obtained.

In the drive of the ninth aspect of invention for recording and/or reproducing an optical recording medium, in which information can be recorded in tracks formed by both lands and grooves provided between lands, and rows of prepits corresponding to preformat information in both adjacent lands and grooves are formed by deviating in the circumferential direction, while controlling the tracking on the basis of the tracking error signal produced by a detector, a peak hold circuit for holding the peak of the tracking error signal is provided in order to record and/or reproduce the optical recording medium conforming to the fourth to sixth aspects of the invention, and the tracking is controlled according to the output signal of the peak hold circuit.

In the drive, in order to record and/or reproduce the optical recording medium of the fourth to sixth aspects of the invention, the peak hold circuit holds the peak of the tracking error signal. Accordingly, the tracking is controlled on the basis of the output signal of the peak hold circuit. As a result, a tracking error signal necessary for accurate track counting can be obtained from the optical recording medium of the fourth to sixth aspects of the invention.

The above and further objects and features of the invention will more fully be apparent from the following detailed description with the accompanying drawings.

BRIEF DESCRIPTION OF THE SEVERAL VIEWS OF THE DRAWINGS

FIGS. 2(a), 2(b), 2(c) and 2(d) are diagrams for explaining an example of a conventional recording and reproducing system of ID signal.

FIGS. 8(a) and 8(b) are diagrams showing the constitution of an ID information region of an optical recording medium (second embodiment) of the invention.

DETAILED DESCRIPTION OF THE INVENTION

Figure 1:
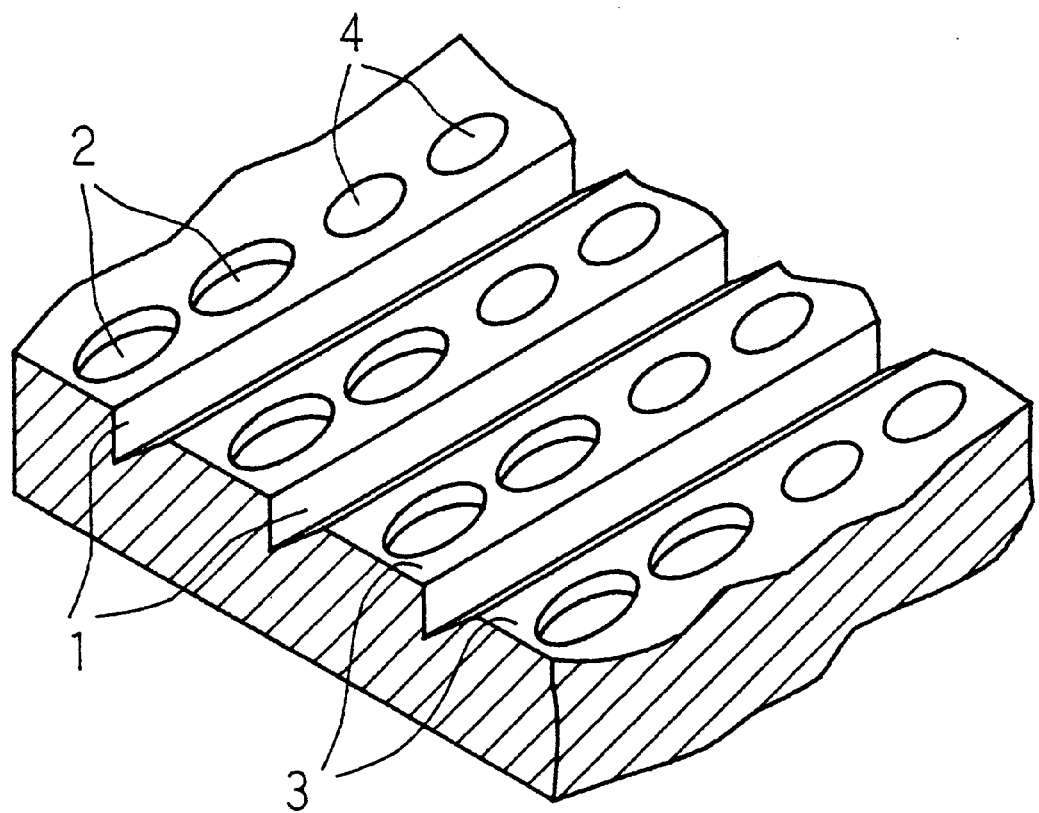
FIG. 1 is a partially cut-away perspective view showing the constitution of a conventional optical recording medium.
Figure 3:
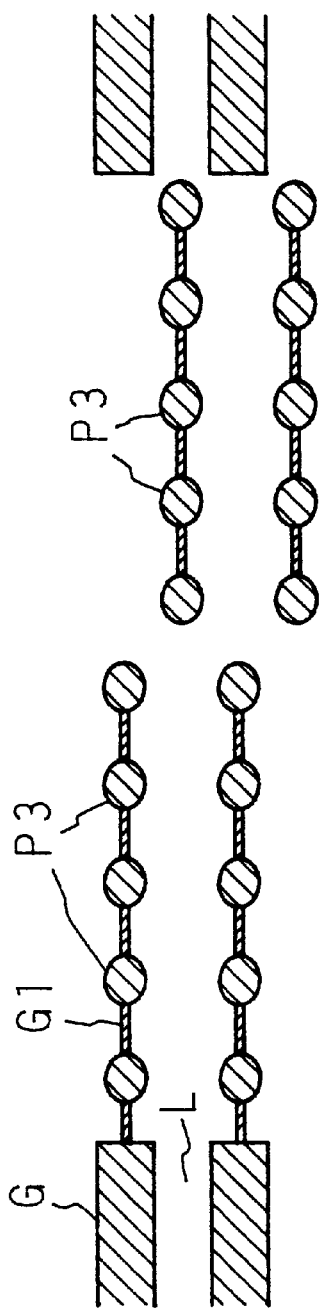
FIG. 3 is an explanatory diagram showing the constitution of an ID information region of a conventional optical recording medium.

Referring now to the drawings, embodiments of the invention are described in detail below.

First Embodiment

Figures 4A, 4B:
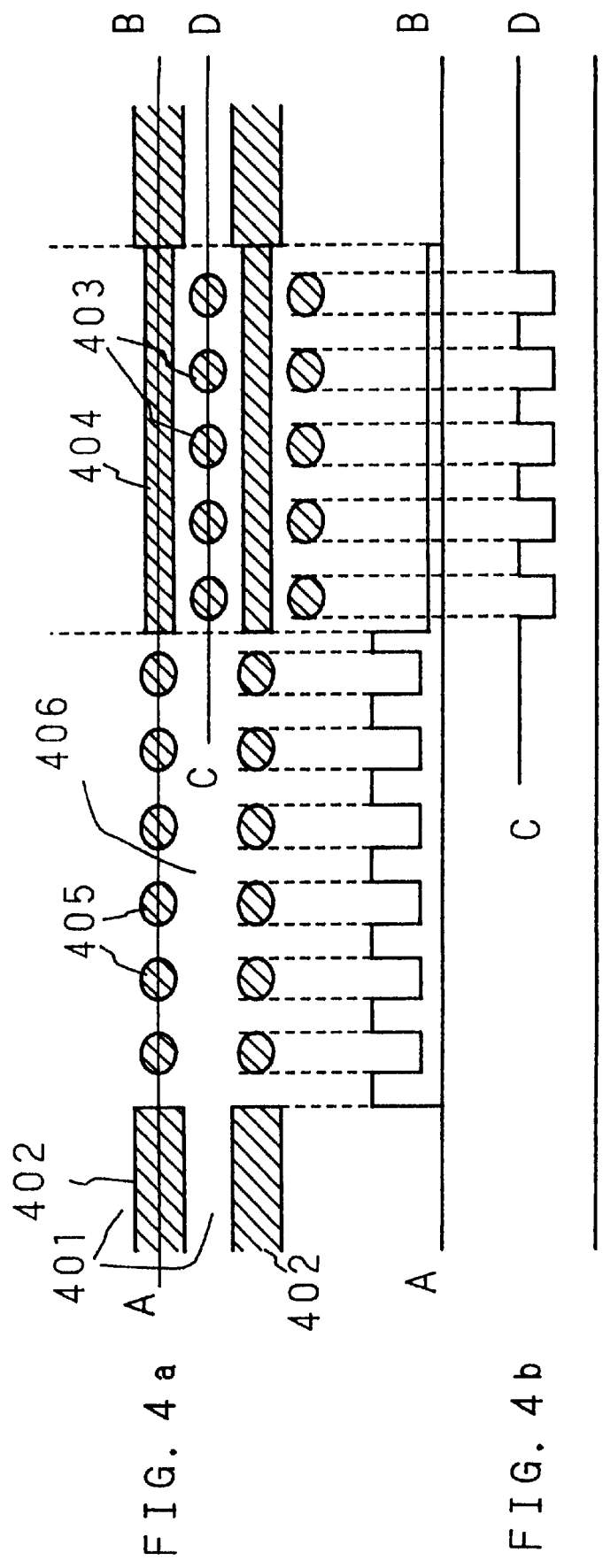
FIGS. 4(a) and (b) are diagrams showing the constitution of an ID information region of an optical recording medium (first embodiment) of the invention.

FIG. 4 is a diagram showing the composition of an ID information region of an optical disk as an optical recording medium according to a first embodiment of the invention, and FIG. 4 (a) and (b) are respectively plan view and side sectional view. The hatching portion in FIG. 4 (a) is a concave formed portion as shown in FIG. 4 (b).

In this optical disk, information can be recorded in the tracks formed by both lands 401 and grooves 402 provided between the lands 401. Rows of prepits 403, 405 corresponding to the preformat information of the adjacent lands 401 and grooves 402 are formed by deviating in the circumferential direction. Besides, at both sides of the row of prepits 402 for the land 401, a counting groove 404 for counting the tracks is formed.

The counting groove 404 is formed to appear deeper than the prepits 403 for the land 401 when seen by light (that is, deep or wide in shape). Therefore, when seeking this portion, the light recognizes the prepit 403 as the land and the counting groove 404 as the groove. Usually, the angle formed by the trace of the light when seeking by the optical disk drive and the track is 3 to 4°. In the conventional drive, the frequency band of the servo system is scores of kHz, and therefore as compared with the prepit size, the frequency is low, and although the prepit 405 portion of the groove 402 and the prepit absent portion appear to be uniform in depth, the prepit is deeper than the absent portion 406, so that the light recognizes the prepit 405 as the groove and the prepit absent portion 406 as the land.

Figure 5:
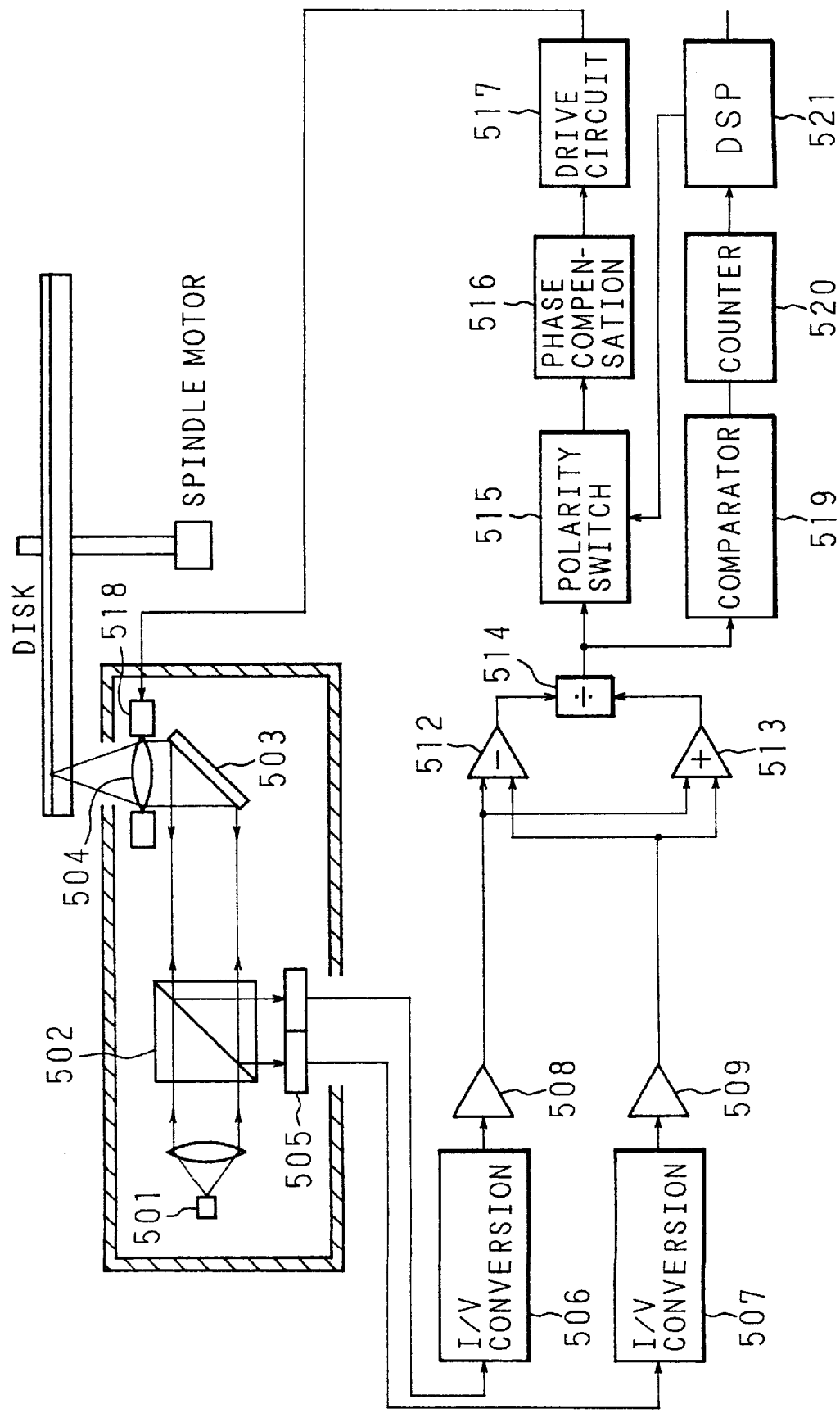
FIG. 5 is a block diagram showing the constitution of a general drive.
Figure 6:
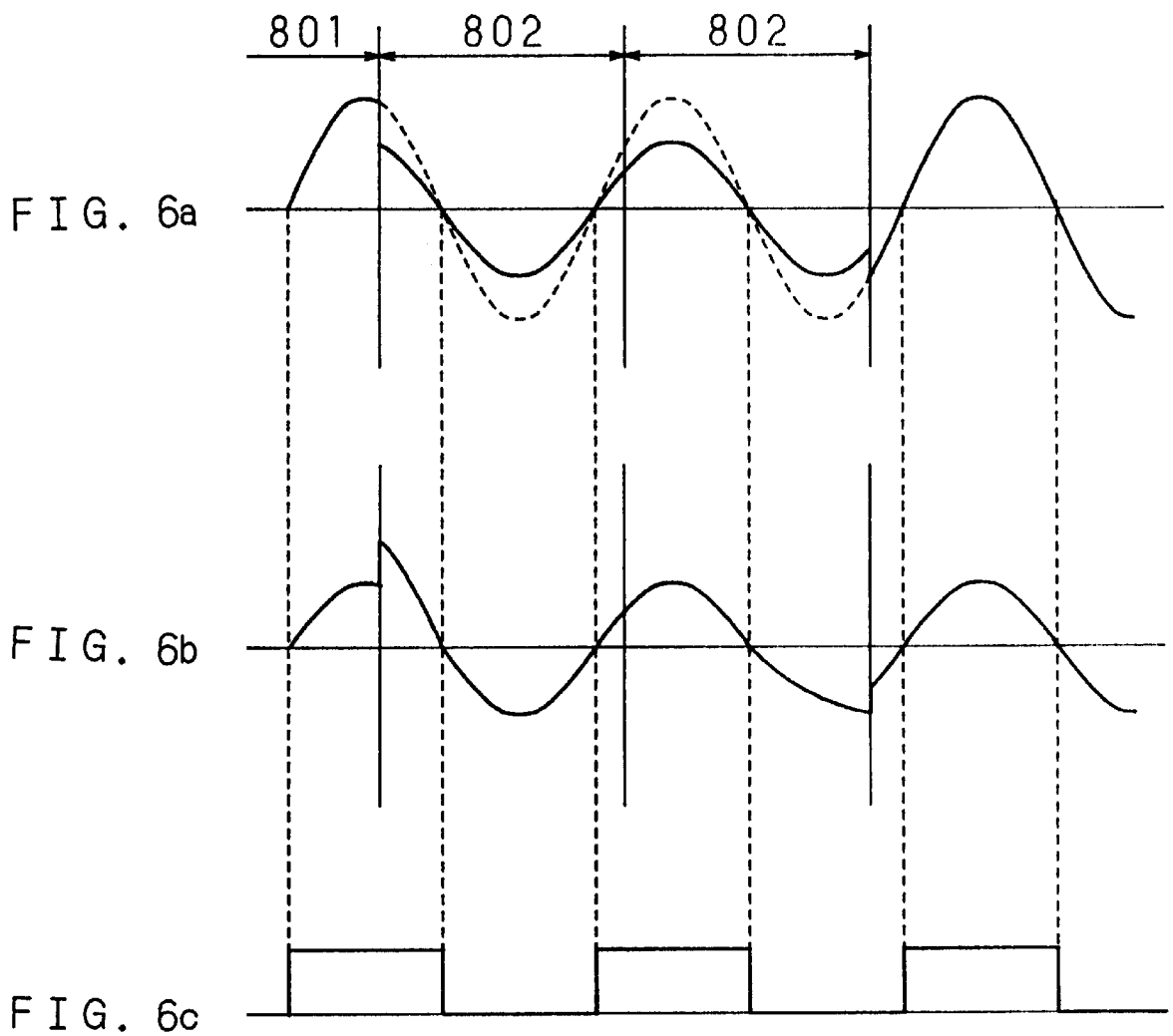
FIGS. 6(a), 6(b) and 6(c) are waveform diagrams showing a TES waveform from an optical recording medium of the invention.

Therefore, when this optical disk is played by a general drive as shown in FIG. 5, the seeking waveform of TES (tracking error signal) becomes as shown in FIG. 6 (a). In FIG. 6 (a), a range 801 is a groove, and a range 802 is an ID information region. The waveform of TES is put into a comparator of the drive, and is transformed into a binary value. The output of the comparator is as shown in FIG. 6 (c). By counting at the rise or fall of this waveform, the tracks can be counted accurately, so that the speed can be detected without error.

The drive shown in FIG. 5 is a simplified diagram mainly showing the servo system, in which the output light from a laser 501 is shaped into a parallel round beam by a beam shaper, and passes through a beam splitter 502, the optical path is bent by a riser mirror 503, and the light is condensed by an objective lens 504, and is emitted to the disk surface. The light modulated by the groove passes again through the objective lens 504, and is reflected by the beam splitter 502 so that the optical path is bent, and then it is put into a two-division detector 505. The two-division detector 505 converts the two divided input lights into electrical signals, which are put into current/voltage converters 506, 507.

The current/voltage converters 506, 507 convert the input current signals into voltage signals and deliver as outputs. The voltage signals delivered from the current/voltage converters 506, 507 are amplified by amplifiers 508, 509 having a frequency band of scores of kHz, and a difference signal is created in a differential amplifier 512, and a sum signal in an adder 513. The difference signal and the sum signal are put into a divider 514, and the difference signal is divided by the sum signal in the divider 514, and a TES signal is created.

This TES signal passes through a polarity changer 515 for determining to track whether the land or the groove, runs through a phase compensator 516 and a drive circuit 517, and reaches an actuator 518, where automatic focusing and automatic tracking are applied to the objective lens 504. The output of the divider 514 is also given to a comparator 519, and is transformed into a binary value, which is counted by a counter 520. The counted value is given to a DSP 521 as the number of tracks, and the DSP 521 detects the moving speed of the optical head from the counting value and the timing.

Figure 7:
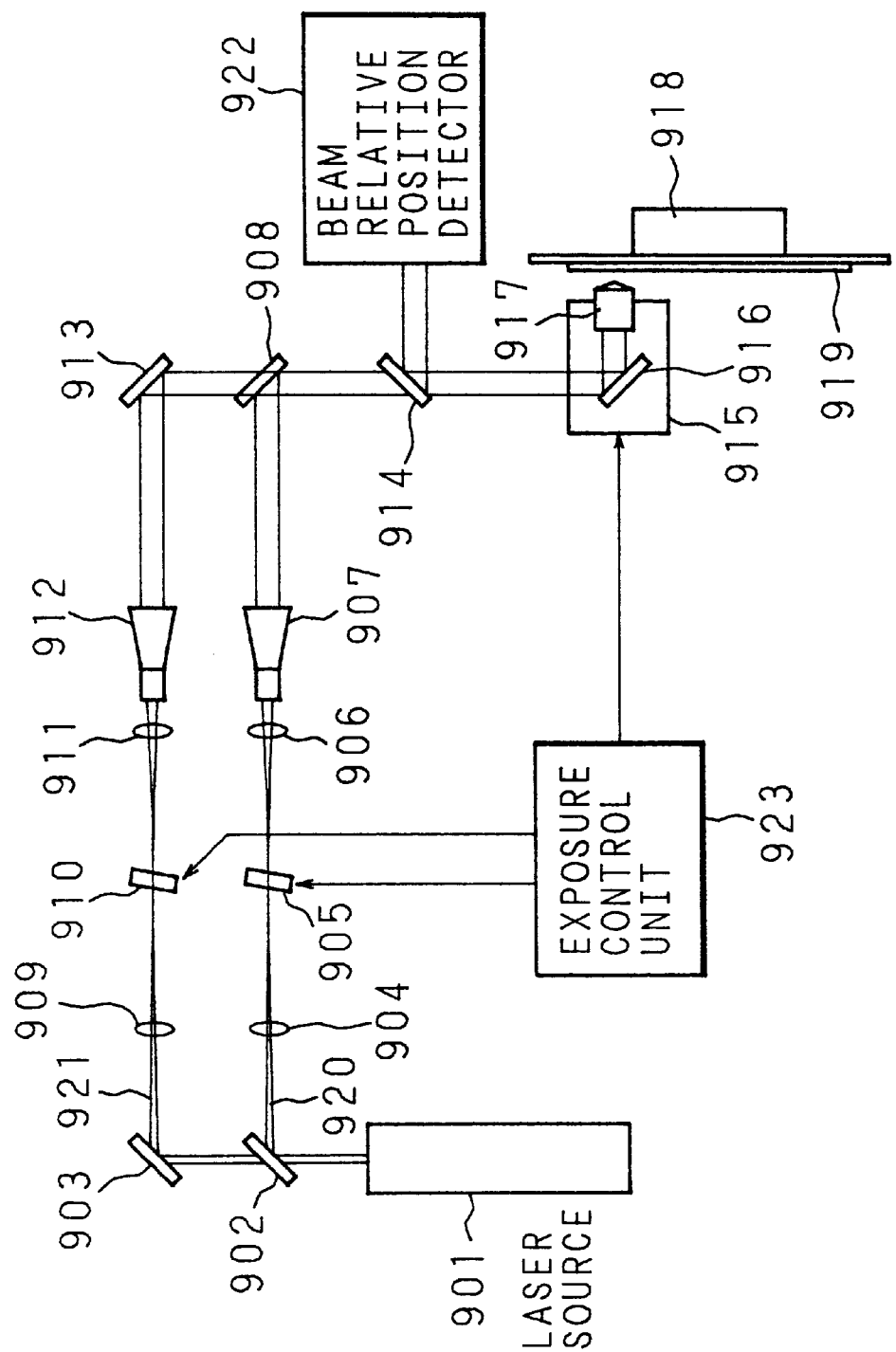
FIG. 7 is a block diagram showing the constitution of a pregroove writer.

A manufacturing method of such optical disk is described below. A glass plate is exposed, spin-developed and dried by a pregroove writer as shown in FIG. 7. The groove pitch is 1.4 μm (land 0.7 μm/groove 0.7 μm). In the pregroove writer shown in FIG. 7, on a polished glass plate 919, photo resist is applied in a thickness of 80 nm by spin coating method, it is pre-baked in a clean oven for 30 minutes at 90° C., and the glass plate 919 is put on a sample table having a spindle motor 918 of this pregroove writer.

The beam light emitted from an Ar laser light source 901 is transmitted and reflected by a half mirror 902, and is divided. A first beam light 920 reflected by the half mirror 902 is put into a first condenser lens 904. The light condensed by the first condenser lens 904 is put into a first AOM (acousto-optic modulator) 905, and the light intensity is modulated. The light modulated of intensity is put into a first collimator lens 906, and is returned to parallel light, and is put into a first beam expander 907. The light expanded in diameter by the first beam expander 907 is reflected by a half mirror 908, and is put into a half mirror 914.

On the other hand, a second beam light 921 transmitted through the half mirror 902 and reflected by a mirror 903 follows the same optical path as the first beam light 920. That is, the second beam light 921 is put into a second condenser lens 909 to be condensed, and is put into a second AOM 910 to be modulated of light intensity. The light modulated of intensity is put into a second collimator lens 911 to be returned to parallel light, and is put into a second beam expander 912. The light expanded in diameter in the second beam expander 912 is reflected by a mirror 913, and passes through the half mirror 908, and is put into the half mirror 914.

The first collimator lens 906 and second collimator lens 911 are composed to be movable in a direction orthogonal to the optical axis, and the relative position of the first beam light and second beam light is controlled by this move.

The first and second beam lights passing through the half mirror 914 are put into an optical head 915 while maintaining the relative position controlled by the first and second collimator lens 906, 911. The optical head 915 has a dichroic mirror 916 and an objective lens 917, and is composed to be movable in a direction vertical and parallel to the sample table. The first and second beam lights are reflected by the dichroic mirror 916, and condensed on the glass plate 919 by the objective lens 917.

Focusing on the glass plate 919 is controlled by the move of the optical head 915 in the vertical direction. A laser beam at wavelength of 780 nm at which the photo resist of the glass plate 919 is not sensitized is emitted to the glass plate 919, and depending on the focusing error signal by its reflected light, the optical head 915 is moved in the vertical direction, and the focus is controlled.

The position on the glass plate 919 irradiated with the first beam light and second beam light is controlled by the move of the optical head 915 in the parallel direction, and the move of the optical head 915 in the parallel direction is executed by an instruction from an exposure control unit 923. The exposure control unit 923 gives an instruction of exposure power to the first and second AOM 905, 910, and the degree of modulation of light intensity is controlled. By this control, the optical depth of the grooves and prepits formed in the glass plate 919 is controlled.

The first beam light and second beam light condensed and reflected on the glass plate 919 are reflected by the dichroic mirror 916, and reflected by the half mirror 914, and put into a beam relative position detector 922. In the beam relative position detector 922, the relative position of the first beam light and second beam light can be monitored.

The glass plate 919 thus finished in exposure, development and drying is evaporated with 0.2 $\mu$m of Ni by a vacuum deposition machine, and a plating electrode is obtained. Then, 0.3 mm of Ni is plated by electroplating. Peeling off Ni from the glass plate 919, the inner circumference and outer circumference are formed to a size of a stamper of a molding machine, and an optical disk board of polycarbonate is fabricated by injection molding. This optical disk board is laminated with 70 nm of SiN by RF magnetron sputtering as lower layer, 8 nm of $Gd_{22}(Fe_7Co_{30})_{78}$ as reading layer, 17 nm of $Tb_{20}(Fe_{90}Co_{10})_{80}$ as recording layer, 15 nm of SiN as upper layer, and 100 nm of Al as reflective film by sputtering.

Second Embodiment

FIG. 8 is a diagram showing a composition of ID information region of an optical disk as an optical recording medium according to a second embodiment of the invention, and FIG. 8 (a) and (b) are respectively plain view and side sectional view. The hatching portion in FIG. 8 (a) is a concave formed portion as shown in FIG. 8 (b). In this optical disk, contrary to the optical disk shown in FIG. 4 in which the groove 402 is deeper than the prepit 405, the groove 402a is shallower than the prepit 405.

When this optical disk is played by the drive shown in FIG. 5, the seeking waveform of TES is as shown in FIG. 6 (b). As compared with FIG. 6 (a) by the optical disk in the first embodiment shown in FIG. 4, the TES output is weaker, but the phase is not changed, and this output enters the comparator in the drive, and is transformed into a binary value. This output is as shown in FIG. 6 (c). By counting at the rise or fall of this waveform, the tracks can be counted correctly, and the speed can be detected without error. The other constitution and manufacturing method are same as in the case of the optical disk in the first embodiment shown in FIG. 4, and the description is omitted.

The first and second embodiments are specifically described above, and the invention is, in short, characterized by forming a signal region (counting groove 404) for recognizing that the prepit is a prepit for the land, on both sides of the prepit 403 for the land. That is, when seeking the prepit 403 corresponding to the land 401, and the portion of the signal region (counting groove 404) at its both sides, it is recognized that the prepit 403 is on the extension of the land 401 and that the signal region (counting groove 404) is on the extension of the groove 402.

Third Embodiment

Figures 9A, 9B:
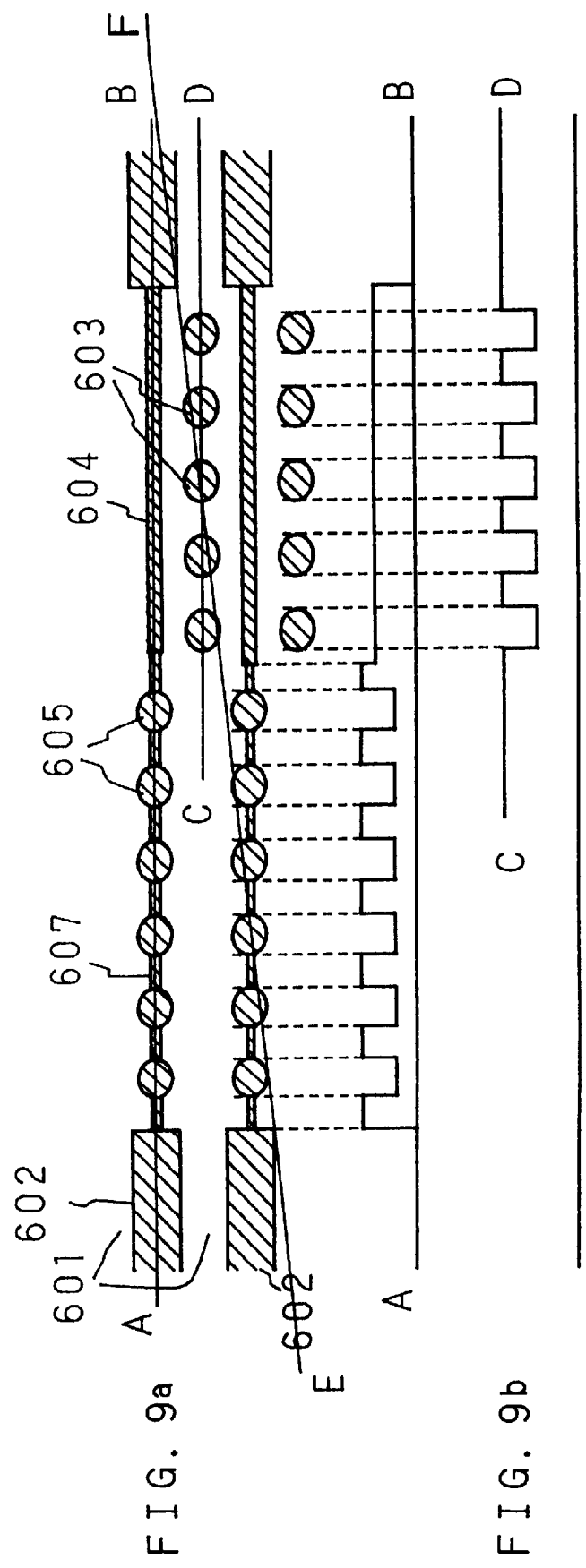
FIGS. 9(a) and 9(b) are diagrams showing the constitution of an ID information region of an optical recording medium (third embodiment) of the invention.

FIG. 9 is a diagram showing the composition of an ID information region of an optical disk as an optical recording medium according to a third embodiment of the invention, and FIG. 9 (a) and (b) are respectively a plan view and a side sectional view. The hatching portion in FIG. 9 (a) is a concave formed portion as shown in FIG. 9 (b).

In this optical disk, information can be recorded in the tracks formed by both lands 601 and grooves 602 provided between the lands 601. Rows of prepits 603, 605 corresponding to the preformat information of the adjacent lands 601 and grooves 602 are formed by deviating in the circumferential direction. At both sides of the row of prepits 603 for the land 601, a counting groove 604 for counting the tracks is formed, and a penetration groove 607 penetrating through the row of prepits 605 for the groove 602 is formed. The prepits 603 for the land 601 are formed to appear to be deeper than the counting groove 604 when seen by light (deeper or wider in shape). The penetration groove 607 is formed to appear to be shallower than the prepits 605 for the groove 602 when seen by light.

Figure 10:
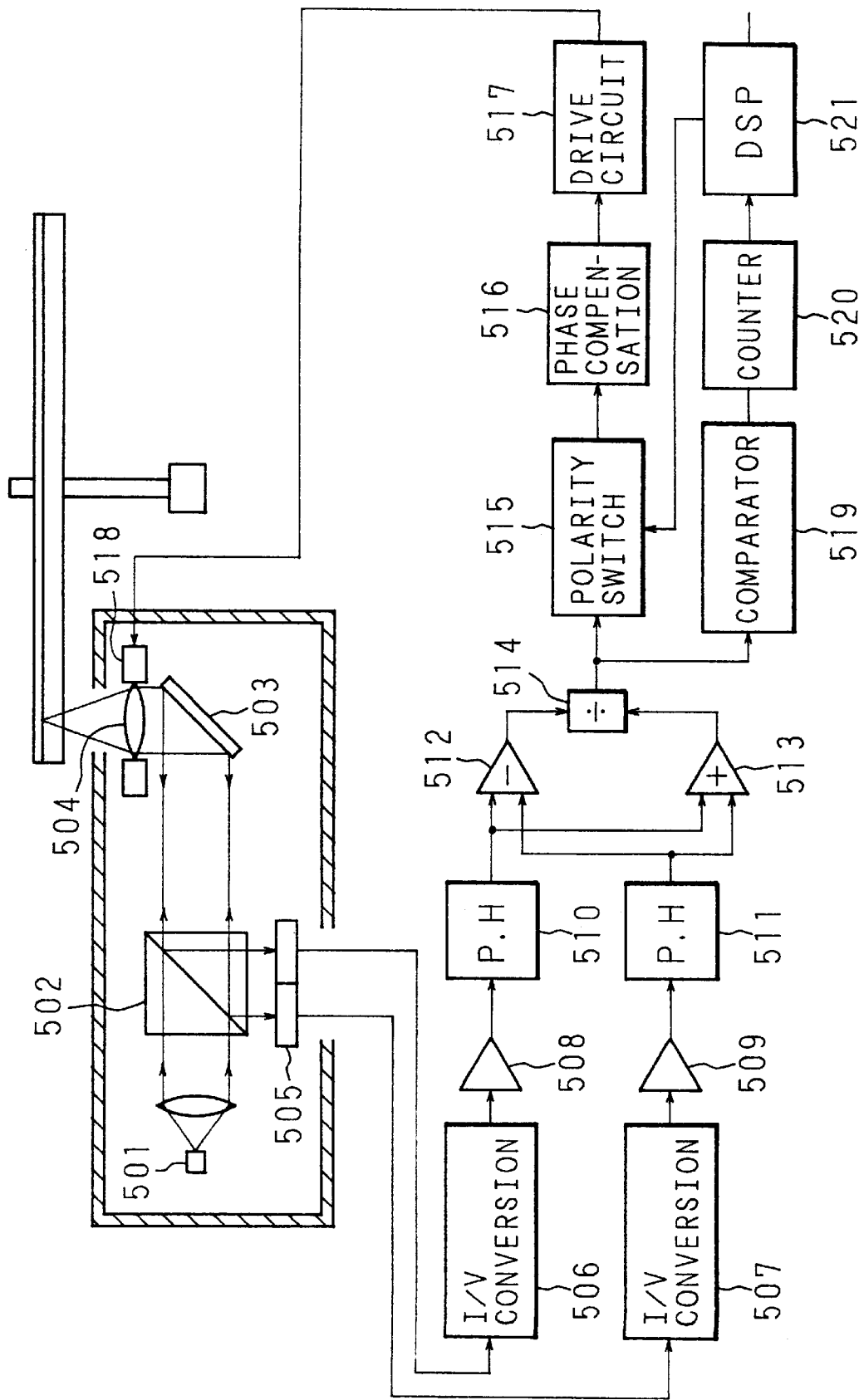
FIG. 10 is a block diagram showing the constitution of a drive of the invention.

FIG. 10 is a block diagram showing a structural example of drive for such optical disk. In FIG. 10, same reference numerals are attached to corresponding parts in FIG. 5. The difference between the drive shown in FIG. 10 and the conventional drive shown in FIG. 5 is as follows: the frequency band of the amplifiers 508, 509 in which the outputs of the two-division detector 505 are entered after current/voltage conversion is such an extent that the signal from prepits can be distinguished, for example, about 10 MHz, and the outputs of the amplifiers 508, 509 are given respectively to the differential amplifier 512 and adder 513 through peak hold circuits 510, 511.

Figures 11A, 11B:
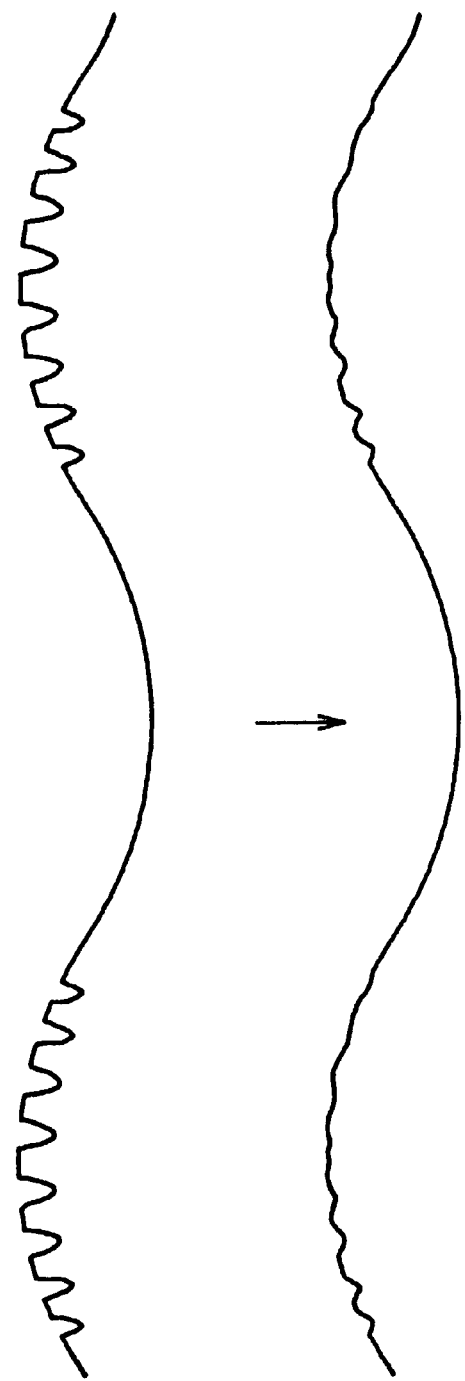
FIGS. 11(a) and 11(b) are diagrams for explaining the operation of a peak hold circuit.
Figure 12:
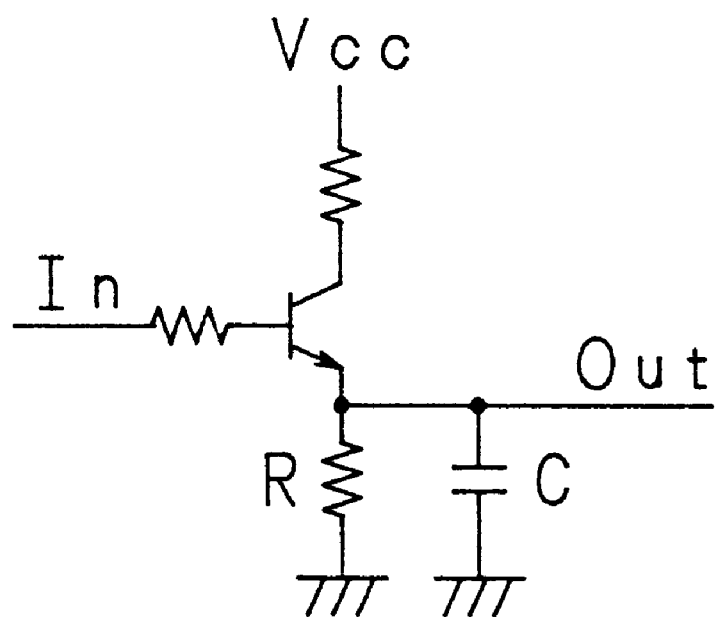
FIG. 12 is a structural diagram of the peak hold circuit.
Figure 13A:
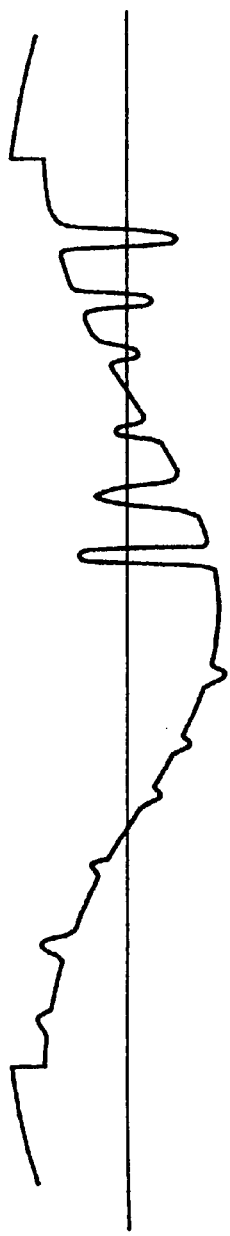
FIGS. 13(a), 13(b), 13(c) and 13(d) are diagrams showing a TES waveform from an optical recording medium of the invention.
Figure 13B:
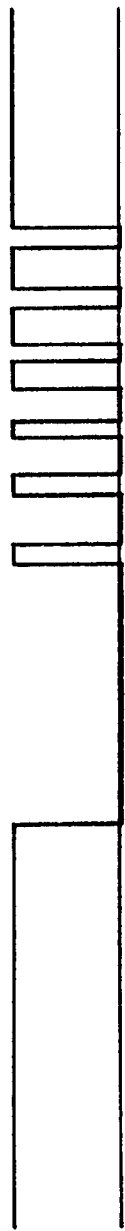
Figure 13C:
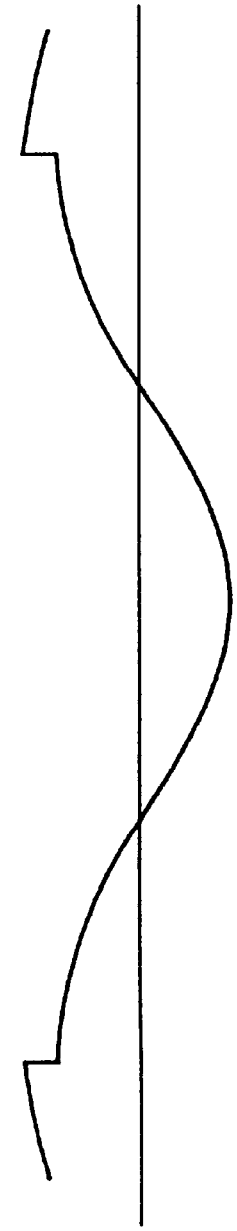
Figure 13D:

FIG. 11 (a) shows an output waveform of an amplifier 508 by amplifying one output of the two-division detector. Aside from the modulation by groove, the modulation by pit is applied. When passing it through a peak hold circuit having a proper discharge, the waveform as shown in FIG. 11 (b) is obtained. The peak hold circuit is composed as shown in FIG. 12, and depending on the disk rotating speed and pit length, the values of C and R may be selected properly so that the output waveform may be as shown in FIG. 11 (b).

By playing the optical disk composed as shown in FIG. 9 in the drive shown in FIG. 10, supposing the seeking trace is as indicated by EF in FIG. 9 (a), if the peak hold circuits 510, 511 of the drive shown in FIG. 10 are detached, the TES waveform obtained from the divider 514 is as shown in FIG. 13 (a), and by counting by the counter 520 through the comparator 519, as shown in FIG. 13 (b), it is counted that the track is crossed by the number of times corresponding to the prepits, and this portion is falsely detected to be a speed several times more than the actual speed.

By adding the peak hold circuits 510, 511, accordingly, the TES waveform becomes as shown in FIG. 13 (*c*), and by passing it through the comparator 519, the waveform is rectangular as shown in FIG. 13 (*d*), and the tracks can be counted correctly, so that the speed can be detected without error. The other constitution and manufacturing method are same as in the case of the optical disk in the first embodiment shown in FIG. 4, and the description is omitted.

Fourth Embodiment

Figures 14A, 14B, 14C:
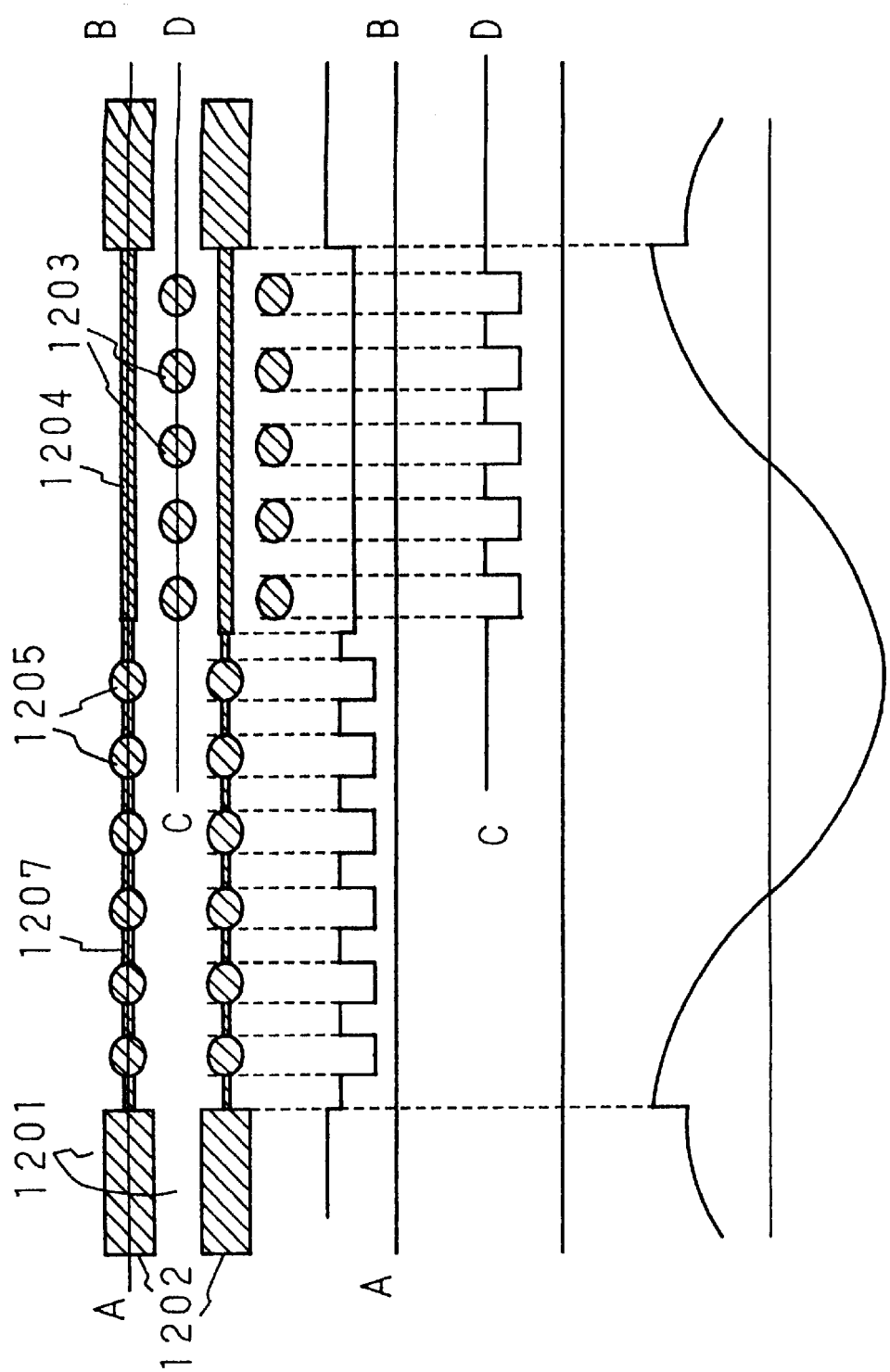
FIGS. 14(a), 14(b) and 14(c) are diagrams showing the constitution of an ID information region of an optical recording medium (fourth embodiment) of the invention.

FIG. 14 is a diagram showing the composition of an ID information region of an optical disk as an optical recording medium according to a fourth embodiment of the invention, and FIG. 14 (*a*) and (*b*) are respectively plan view and side sectional view. The hatching portion in FIG. 14 (*a*) is a concave formed portion as shown in FIG. 14 (*b*). FIG. 14 (*c*) shows the TES waveform as described below.

In this optical disk, information can be recorded in the tracks formed by both lands 1201 and grooves 1202 provided between the lands 1201. Rows of prepits 1203, 1205 corresponding to the preformat information of the adjacent lands 1201 and grooves 1202 are formed by deviating in the circumferential direction.

At both sides of the row of prepits 1203 for the land 1201, a counting groove 1204 for counting the tracks is formed, and a penetration groove 1207 penetrating through the row of prepits 1205 for the groove 1202 is formed. The groove 1202 is formed shallower than the counting groove 1204, and also shallower than the penetration groove 1207. The other deep and shallow relation is same as in FIG. 9 (third embodiment).

This optical disk of the fourth embodiment is also recorded and/or reproduced by the drive shown in FIG. 10, same as in the third embodiment. The TES waveform is as shown in FIG. 14 (*c*), and same as in the third embodiment, the tracks can be detected and the speed of the optical head can be detected accurately. Moreover, in the fourth embodiment, since the prepits 1203, 1205 are deep, the ID information signal is large, whereas the groove 1202 of the information recording region is shallow, so that the S/N ratio of information signal is large.

To manufacture such board, however, the following process is needed. On the glass plate, first, photo resist of low sensitivity is applied in a depth of groove of information recording region by spin coating, and further photo resist of high sensitivity is applied by spin coating in a thickness of (depth of deepest prepit)—(depth of groove of information recording region), and by controlling the exposure power, grooves of information recording region are formed by weak light, and grooves of ID information region and prepits by strong light. The method of applying such two layers of photo resist is disclosed, for example, in Japanese Patent Application Laid-open No. 7-161077.

The third and fourth embodiments are specifically described herein, and in short the invention is characterized by disposing track counting grooves 604 at both sides of the prepits 603 for land, and adding peak hold circuits to the servo detection system of the drive. That is, when seeking the prepits 603 corresponding to the lands 601 in the portions of the counting grooves 604 on both sides, since there are counting grooves, the phase of the tracking error signal is not disturbed. Therefore, the target track can be traced accurately without making error in speed detection.

Thus, according to the optical recording medium of the invention, the tracking error signal necessary for accurate track counting and an ID signal of a sufficient amplitude can be obtained. Besides, by using the drive as shown in FIG. 10, the tracking error signal necessary for accurate track counting can be obtained from the optical disk shown in FIG. 9 and FIG. 14.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An optical recording medium, in which information can be recorded in tracks formed by successive land areas and groove areas provided between the land areas, and rows of prepits corresponding to preformat information in both land areas and groove areas formed by deviating in the circumferential direction, comprising:

counting grooves for counting tracks, formed at both sides of the rows of land area prepits; and penetration grooves formed so as to penetrate through the rows of groove area prepits, wherein the penetration grooves have a depth or width different from that of the groove areas, the groove area prepits are formed wider and/or deeper than the penetration groves, the counting grooves have a depth or width different from that of the groove areas, and the land area prepits are formed wider and/or deeper than the counting groves.

2. An optical recording medium of claim 1, wherein the groove area prepits are formed narrower and/or shallower than the groove areas, and the counting grooves are formed narrower and/or shallower than the groove areas.

3. An optical recording medium of claim 1, wherein the penetration grooves and the counting grooves are formed narrower and deeper than the groove areas.

4. An optical recording medium, in which information can be recorded in tracks formed by successive land areas and groove areas provided between the land areas, and rows of prepits corresponding to preformat information in both land areas and groove areas formed by deviating in the circumferential direction, comprising:

counting grooves for counting tracks, formed at both sides of the rows of land area prepits; and penetration grooves formed so as to penetrate through the rows of groove area prepits, wherein the penetration grooves have a depth or width different from that of the groove areas, the groove area prepits are formed wider and/or deeper than the penetration grooves, the counting grooves have a depth or width different from that of the groove areas, and the land area prepits are formed wider and/or deeper than the counting grooves;

wherein recording and/or reproducing data thereof is driven by a drive which comprises:

a detector for detecting reflected light from the optical recording medium;

a peak hold circuit for holding the peak of a detected signal of said detector;

generating means for generating a tracking error signal on the basis of an output signal of said peak hold circuit; and means for controlling tracking of the optical recording medium on the basis of the generated tracking error signal.

5. An optical recording medium, in which information can be recorded in tracks formed by successive land areas and groove areas provided between the land areas, and rows of prepits corresponding to preformat information in both land areas and groove areas formed by deviating in the circumferential direction, comprising:

counting grooves for counting tracks, formed at both sides of the rows of land area prepits; and penetration grooves formed so as to penetrate through the rows of groove area prepits, wherein the penetration grooves have a depth or width different from that of the groove areas, the groove area prepits are formed wider and/or deeper than the penetration grooves, the counting grooves have a depth or width different from that of the groove areas, and the land area prepits are formed wider and/or deeper than the counting grooves;

wherein the groove area prepits are formed narrower and/or shallower than the groove areas, and the counting grooves are formed narrower and/or shallower than the groove areas;

wherein recording and/or reproducing data thereof is driven by a drive which comprises:

a detector for detecting reflected light from the optical recording medium;

a peak hold circuit for holding the peak of a detected signal of said detector;

generating means for generating a tracking error signal on the basis of an output signal of said peak hold circuit; and means for controlling tracking of the optical recording medium on the basis of the generated tracking error signal.

6. An optical recording medium, in which information can be recorded in tracks formed by successive land areas and groove areas provided between the land areas, and rows of prepits corresponding to preformat information in both land areas and groove areas formed by deviating in the circumferential direction, comprising:

counting grooves for counting tracks, formed at both sides of the rows of land area prepits; and penetration grooves formed so as to penetrate through the rows of groove area prepits, wherein the penetration grooves have a depth or width different from that of the groove areas, the groove area prepits are formed wider and/or deeper than the penetration grooves, the counting grooves have a depth or width different from that of the groove areas, and the land area prepits are formed wider and/or deeper than the counting grooves;

wherein the penetration grooves and the counting grooves are formed narrower and deeper than the groove areas;

wherein recording and/or reproducing data thereof is driven by a drive which comprises:

a detector for detecting reflected light from the optical recording medium;

a peak hold circuit for holding the peak of a detected signal of said detector;

generating means for generating a tracking error signal on the basis of an output signal of said peak hold circuit; and means for controlling tracking of the optical recording medium on the basis of the generated tracking error signal.

* * * * *